United States Patent [19]

Deutsch

[11] 4,280,909
[45] * Jul. 28, 1981

[54] MICROPOROUS MEMBER WITH INTERCONNECTED, ORIENTED TAPERED VOIDS

[76] Inventor: Daniel H. Deutsch, 141 Kenworthy Dr., Pasadena, Calif. 91105

[*] Notice: The portion of the term of this patent subsequent to Apr. 3, 1996, has been disclaimed.

[21] Appl. No.: 38,586

[22] Filed: May 14, 1979

Related U.S. Application Data

[63] Continuation-in-part of Ser. No. 910,110, May 30, 1978, abandoned.

[51] Int. Cl.³ .................. B01D 31/00; B01D 53/22
[52] U.S. Cl. .................. 210/490; 210/500.2; 55/158; 417/572
[58] Field of Search ......... 210/500 M, 321 R, 433 M, 210/504, 489, 490, 491; 55/158, 485, 487; 417/572; 264/109, 128; 156/644, 668

[56] References Cited

U.S. PATENT DOCUMENTS

| | | | |
|---|---|---|---|
| Re. 29,524 | 1/1978 | Spencer | 428/134 |
| 3,158,532 | 11/1964 | Poll et al. | 210/504 |
| 3,276,996 | 10/1966 | Lazare | 210/500 M |
| 3,749,646 | 7/1973 | Pirt | 210/22 |
| 3,764,018 | 10/1973 | Shaw et al. | 210/500 M |
| 3,770,532 | 11/1973 | Bean et al. | 156/7 |
| 3,839,201 | 10/1974 | Miller | 210/22 |
| 3,988,245 | 10/1976 | Wang | 210/500 M |
| 4,026,977 | 5/1977 | Bourganel | 264/41 |
| 4,097,383 | 6/1978 | Ohtani et al. | 210/500 M |
| 4,119,418 | 10/1978 | Smid | 55/158 |
| 4,147,481 | 4/1979 | Deutsch | 417/572 |

OTHER PUBLICATIONS

"Membrane Ultrafiltration", Porter et al., Chem. Tech., Jan., 1971.

*Primary Examiner*—Charles N. Hart
*Assistant Examiner*—David R. Sadowski
*Attorney, Agent, or Firm*—Lyon & Lyon

[57] ABSTRACT

A microporous member for causing the circulation of a fluid therethrough. The microporous member is permeated by numerous sequentially interconnected oriented generally tapered voids. The microporous member and a fluid form a system wherein the fluid is urged through the microporous member. The microporous member is useful in causing the circulation of fluids.

4 Claims, 12 Drawing Figures

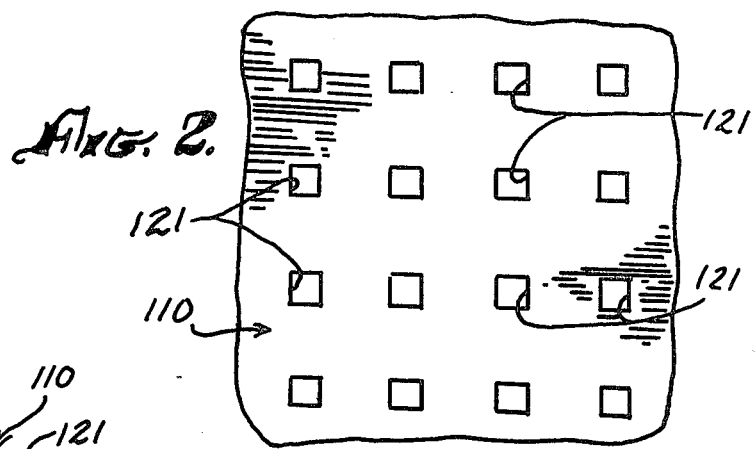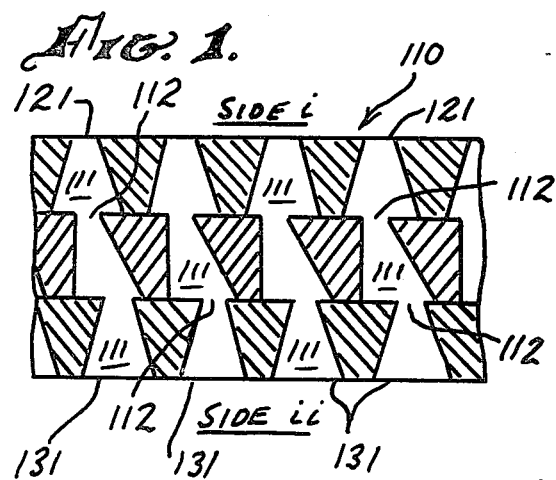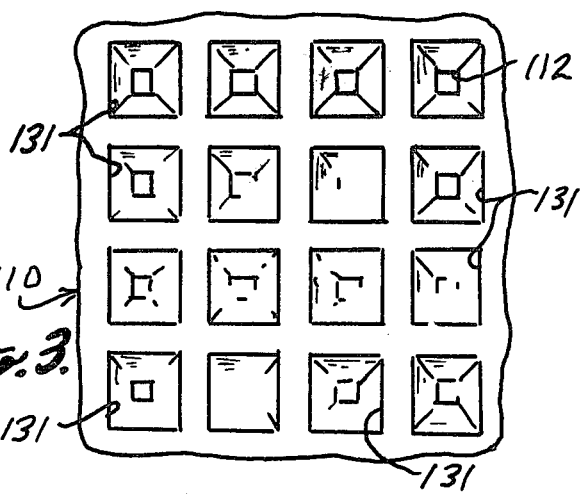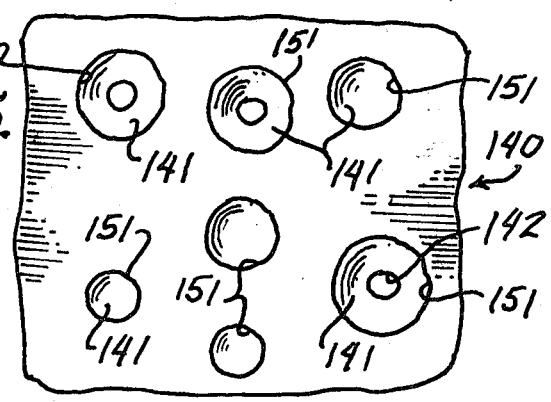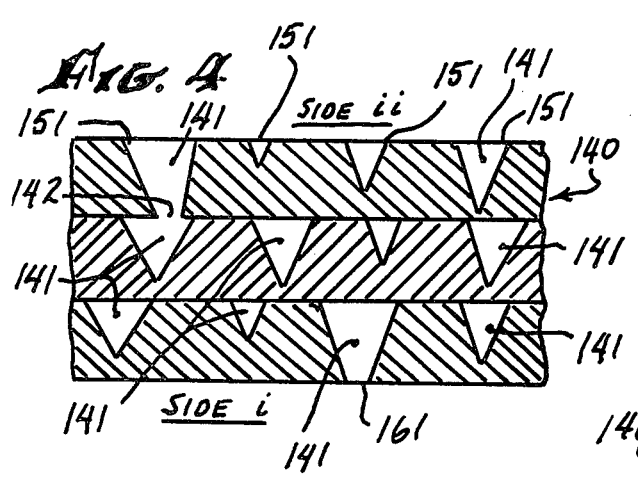

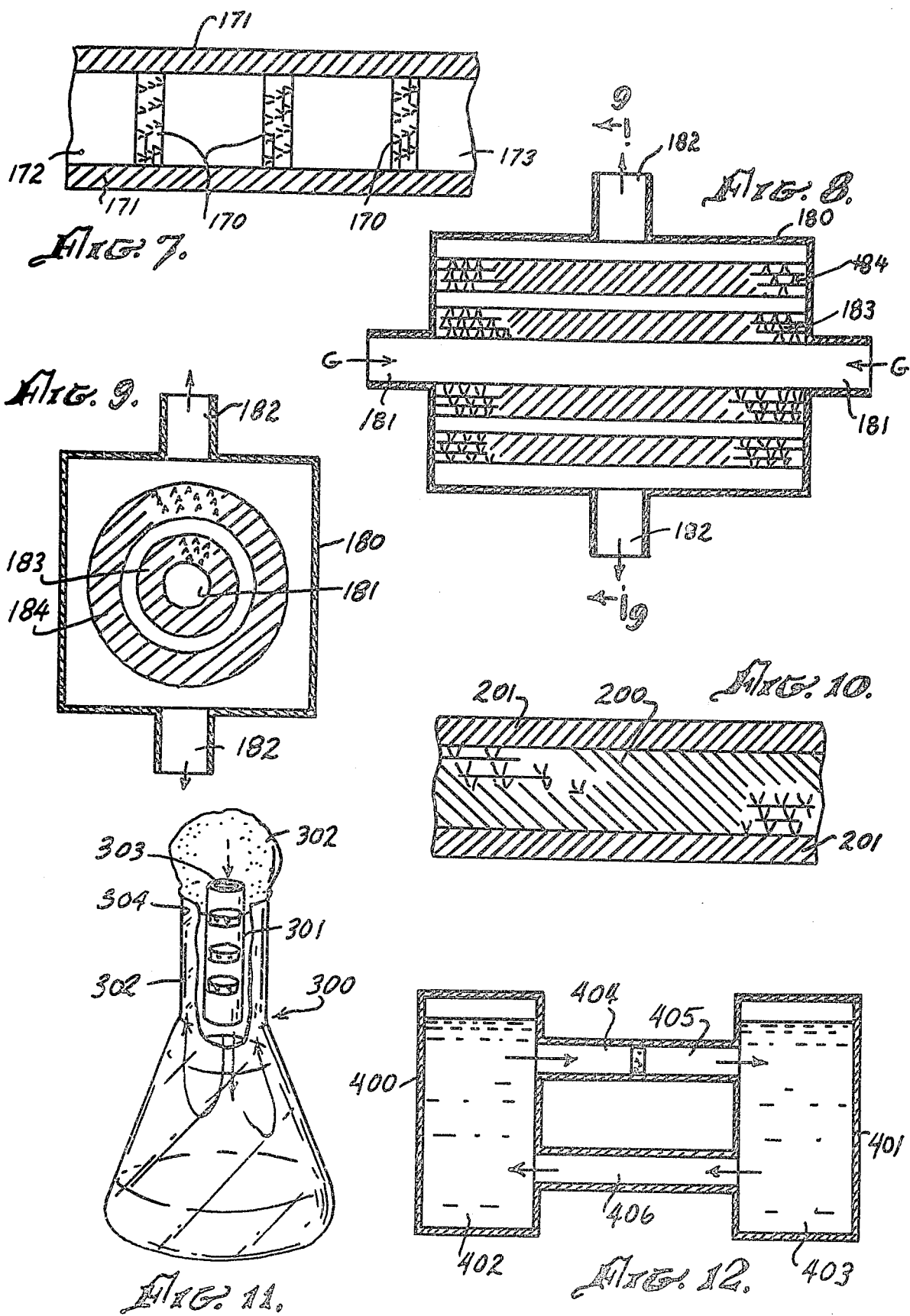

MICROPOROUS MEMBER WITH INTERCONNECTED, ORIENTED TAPERED VOIDS

CROSS REFERENCE TO RELATED APPLICATIONS

This application is a continuation-in-part of my co-pending application Ser. No. 910,110 filed May 30, 1978 now abandoned.

BACKGROUND OF THE INVENTION

The circulation of fluids through open and closed systems has many applications in the arts, sciences and technology. Mechanical reciprocating pumps, centrifugal pumps, undulating tubes, thermal gradients and fans are all commonly used to move fluids. One particular application where the above listed circulating systems are often impractical is in bacteriological research where a sterile flask has a plug of cotton or other porous substance in the neck thereof and ambient air or other gas is allowed to pass through the cotton. For many reactions such as fermentation reactions the rate at which the air passes through the cotton is an important factor which determines the rate at which the reaction takes place.

A major shortcoming of the use of a cotton plug in the sterile shake flask is the very slow rate of gas exchange through the cotton plug. Consequently, the gas exchange through the cotton plug is rate limiting rather than the biological process in the bacteriological medium. Elaborate sterile gas pumping systems have been developed and used to increase the rate of air throughput. However, such systems are quite expensive, difficult to operate and maintain and provide a source of possible contamination. Some bacteriological processes are carried out under reduced pressure or elevated pressure and reactions are also carried out in the presence of a particular gas.

More particularly, the forced flow of gases has typically utilized mechanical compressors or other devices which can give rise to impurities caused by the necessary presence of lubricants. The need for moving gases in highly purified conditions has made most mechanical systems impractical. Furthermore, many gases are not compatible with the common materials of construction and thus can not be pumped by conventional devices. Still further, some processes require elevated temperatures or reduced temperatures. The design of systems for circulating air or other gases is made more difficult by the presence of such conditions.

Before gases used or generated in industrial processing may be discharged into the atmosphere, the gases are required, by law, to be depolluted of objectionable substances. A large part of the cost involved in the depollution process stems from the cost of physically moving the gases through complex systems.

The movement of solvents and solutes through semipermeable membranes has been studied extensively. The phenomena of reverse osmosis through a membrane is used in the desalination of sea water and other liquid purification processes.

When a solution, U, of solute, X in solvent Y, is placed on one side of a semipermeable membrane, M, which is permeable to the solvent, Y, but impermeable to the solute, X, and the pure solvent, Y, is placed on the other side of this semipermeable membrane, M, then an osmotic pressure, $P_c$, develops in the solution U, such that:

$$P_o = cRT \qquad \text{EQ. (1)}$$

Where "c" is the molar concentration of the solute X in the solution U; R is the universal gas constant and T is the absolute temperature. This equation for osmotic pressure was proposed by van't Hoff in 1887.

In the above model, when the solution, U, and the pure solvent, Y, exert the same hydrostatic pressure on the membrane, M, the differential external pressure on the membrane $P_e$, is zero, and the osmotic pressure, $P_o$, generated in this system produces a net flow rate, $J_o$, of the solvent, Y, from the side containing the pure solvent through the semipermeable membrane into the side holding the solution, U, of solute, X, in solvent, Y. $J_o$ is the net flow rate of liquid through the membrane when the differential external pressure on the membrane, $P_e$, is zero.

In the above model, if a differential external pressure on the membrane, $P_e$, is exerted through the solution, U, such that $P_e$ is greater than the osmotic pressure, $P_o$, then the pure solvent, Y, will flow in the reverse direction, from the solution, U, side of the semipermeable membrane into the pure solvent side of the semipermeable membrane. Large scale practical application of this is made in reverse osmosis where pure water is obtained from salt water by the use of a semipermeable membrane, pervious to water but impervious to salt. A very general interrelationship, characteristic of transport phenomena in general during irreversible thermodynamics, for fluxes, forces and their phenomonological coefficients was developed by L. Onsager.

In many instances it is desired to move a fluid (whether it be a gas or a solution) in which there is no concentration difference across the path of flow. In such cases no osmotic pressure, $P_o$, exists. A system is thus needed which will move fluids where there is no concentration or composition change along the flow path.

SUMMARY OF THE INVENTION

It is thus an object of the present invention to provide a microporous member, which is simple to use, inexpensive to maintain and yet effective to cause the flow of certain fluids therethrough. When said microporous member is installed in a conduit, chamber or other container and the said conduit, chamber or other container is filled with certain fluids, the said microporous member will urge the said fluid to flow through the conduit, chamber or other container.

It is another important object of the present invention to provide a gas-urging microporous member, useful for depolluting industrial smoke stack gases.

It is a still further object of the present invention to provide a gas-urging microporous member which consumes no energy.

It is another important object of the present invention to provide a solution-urging microporous member, useful for depolluting polluted industrial liquid waste solutions.

It is a still further object of the present invention to provide a solution-urging microporous member which consumes no energy.

The present invention is for a microporous member fabricated from a relatively fluid impermeable material, and generally having two opposing surfaces in its simplest forms such as a sheet or a hollow tube. Between the two opposite surfaces of the microporous member are numerous generally tapered voids, interconnected with ports, wherein susbstantially all of the generally tapered voids are oriented with their apexes directed toward one of the surfaces of the microporous member and substantially all of the bases of the generally tapered voids are directed toward the opposite surfaces of the said microporous member. A fluid can pass through the said microporous member only by flowing through the generally tapered voids and the interconnecting ports. On the average, any particular particle present in the fluid will have to pass sequentially through at least three interconnected generally tapered voids on passing from the first surface of the microporous member, through the microporous member, to the second surface of the microporous member.

BRIEF DESCRIPTION OF THE DRAWINGS

FIG. 1 is a fragmentary cross-sectional side elevation of a portion of the microporous member of the present invention.

FIG. 2 is a top plan elevation of the portion of the microporous member of FIG. 1.

FIG. 3 is a bottom plan elevation of the portion of the microporous member of FIG. 1.

FIG. 4 is a fragmentary cross-sectional side elevation of a portion of a microporous member of the present invention having irregularly spaced voids.

FIG. 5 is a top plan view of the portion of the microporous member of FIG. 4.

FIG. 6 is a bottom plan view of the portion of the microporous member of FIG. 5.

FIG. 7 is a cross-sectional side elevation of a conduit having three microporous members of the present invention positioned therein.

FIG. 8 is a cross-sectional side elevation of a conduit having two tubular microporous membranes of the present invention positioned therein.

FIG. 9 is a cross-sectional view taken along line 9—9 of FIG. 8.

FIG. 10 is a fragmentary cross-sectional side elevation of a portion of the microporous member of the present invention supported by an inert member.

FIG. 11 is a cross-sectional side view of a flask having a conduit with three microporous members positioned therein.

FIG. 12 is a cross-sectional side elevation of a microporous member mounted in one of two conduits connecting two tanks filled with a solution.

DESCRIPTION OF THE PREFERRED EMBODIMENTS

The cross-sectional view through the microporous member 110 in FIG. 1 is illustrative of the microstructure present in the microporous member of this invention. The generally tapered voids 111 are all aligned so that each of their apexes are directed towards side i and each of their bases are directed towards side ii. The ports 112 interconnect the oriented voids 111. The generally tapered voids, while not all exactly identical in size and shape are approximately identical, are located in a regular square array. The top surface, side i, is shown in FIG. 2 where 121 are the openings in the microporous member 110. The bottom surface, side ii, is shown in FIG. 3 where 131 are the larger openings in the microporous member 110.

The term "tapered" is intended to include shapes such as "conical" and "pyramidal" and such shapes include those which have for their base a plane triangle, rectangle, or other polygon and for their sides several triangles with a common vertex and with their bases forming the sides of the base. The polygon base may have a very large number of sides and may even be curved in a portion or all of its sides.

The microporous member depicted in FIGS. 1–3 can be formed by clamping together three pieces of sheeting cut from a single piece of sheeting wherein the sheeting is perforated in a uniform square array by tapered holes of approximately the same size and shape, and wherein before being clamped together the tapers are oriented to point in the same direction and the holes are aligned so that they fall one on top of another. (The clamping mechanism is not shown in FIGS. 1–3.)

The cross-section view through the microporous member 140 in FIG. 4 is illustrative of the microstructure present in the microporous member of the present invention. The generally tapered voids 141 are conical and all aligned so that each of their apexes are directed towards side i and each of their bases are directed towards side ii. The ports 142 interconnect the oriented voids 141. The generally tapered voids, while not exactly identical in size and shape are approximately identical, are located in a regular array perpendicular to the surfaces of the microporous member and in a irregular array parallel to the surfaces of the microporous member. The top surfaces, side i, is shown in FIG. 5 where 151 are the openings in the microporous member 140. The bottom surface, side ii, is shown in FIG. 6 where 161 are the openings in the microporous member 140.

The microporous member depicted in FIGS. 4–6 can be formed by sealing together three pieces of sheeting cut from a single piece of sheeting wherein the sheeting is perforated in a random array by tapered holes of approximately the same size and shape. In this case not all the voids will interconnect the two surfaces.

The microporous member depicted in FIGS. 4–6 can be formed by clamping together three pieces of sheeting cut from a single piece of sheeting wherein the sheeting is perforated in a random array by tapered holes approximately the same size and shape. In this case not all voids will interconnect the two surfaces. (The clamping mechanism is not shown in FIGS. 4–6.)

The microporous member can be sealed, gas tight, inside a gas impervious conduit. Three such oriented microporous members, 170 are shown in FIG. 7 sealed in a conduit 171. The three microporous members, 170, in FIG. 7 are oriented so that the apexes of the generally tapered voids are all pointed in the same general direction towards exit ports 173, FIG. 7. In the atmosphere of a gas, G, under specified temperature and pressure and wherein the effusional resistance coefficient, $\xi$, defined below, of the unit as a whole, between the entrance port 172 and the exit port 173, is greater than $10^{-4}$ and less than 2.0, the said gas, G, is urged through the conduit from port 172 to port 173.

The microporous member, in the form of tubes, 183 and 184 can be mounted in a gas tight chamber 180 as shown in FIG. 8. The entrance ports for the gas, G, are shown as 181 and the corresponding exit ports are 182. Two concentric tubes of the microporous member, 183 and 184, oriented so that the apexes of the generally pyramidal voids are directed outward from the central axis of the tubes are sealed gas tight into the said chamber.

An alternate cross-sectional view of the chamber shown in FIG. 8 is depicted in FIG. 9.

The microporous member 200 of FIG. 10 is shown supported by two coarse porous glass members 201.

The use of three microporous members, mounted in a conduit as shown in FIG. 7, is shown in FIG. 11 where it is used in the neck of a bacterological flask 300. The bacteriological flask 300 holds the three microporous members mounted in the conduit 301. A wad of cotton 302 holds the conduit 301 in place and maintains the sterility. Air enters at 303, is urged through the conduit 301 by the microporous members, passes into the flask and then out at 304.

A microporous member mounted in a conduit as part of a solution circulating system is depicted in FIG. 12. Two tanks, 400 and 401 are connected by two conduits 404 and 406, and a microporous member 405 is sealed, solution tight, into conduit 404 such that substantially all of the apexes of the generally pyramidal voids permeating the microporous member are directed toward tank 401. The tanks 400 and 401, and the conduits 404 and 406 are filled with a solution U of the solute S in the solvent Y. Under zero external pressure, $P_e$, the solution U is urged through the microporous member 405 and thus the solution U is circulated between the two tanks in the directions indicated by the arrows.

If the solutions 402 and 403 in the tanks 400 and 401 respectively were held at different temperatures, the unit depicted in FIG. 12 would act as a heat transfer device, effectively transferring heat from the hotter tank to the colder tank. Such heat transfer devices find extensive use in various technologies such as nuclear energy and the chemical processing industry.

The microporous member, permeated by numerous sequentially interconnected generally tapered voids, wherein essentially all the generally tapered voids are similarly oriented and closely aligned, can be formed into a wide variety of shapes depending upon the specific requirements of a particular application. This invention, as herein described, is intended to cover only the basic microscopic structure making up the microporous member and not any specific shape or configuration into which the microporous member might be fabricated. Thus the microporous member could, among others, be in the form of a thin sheet, a plate, a rod, a hollow tube, a tube closed at one end, a hollow sphere, or a hollow box, to mention but a few of the possible forms.

It is contemplated that while three sequentially connected generally tapered voids may be used in some cases in general a much larger number will be employed such as 50, 700, 40,000 or even 10,000,000. In all cases a substantial majority of the apexes of the generally tapered voids are directed toward one of the surfaces of the microporous member and the corresponding bases of the generally tapered voids are directed towards the opposite surface of the microporous member.

It is further contemplated that two or more microporous members can be used in series whereby the effect of one microporous member is augmented by additional microporous members.

The microporous member is greater than 0.001 micron in thickness and less than 100 centimeters in thickness.

The dimensions of the generally tapered voids constitute an important part of this invention. The average distance across the base of the generally tapered void is greater than 0.001 micron and is less than 100 microns.

The average angle at the apex of the generally tapered void is greater than about 10° and less than about 160°. The average distance across the ports interconnecting the generally tapered voids is greater than 0.0002 micron and less than 100 microns. On the average, each generally tapered void will have at least two and less than 16 ports interconnecting it with other generally tapered voids.

The average density of asymmetric pores through the microporous member is greater than about 10 per square centimeter and limited only by the loss of structural integrity on the high side. Densities of the order of $10^{14}$ per square centimeter are contemplated.

The microporous member of this invention can be fabricated from a very wide variety of materials such as, but not limited to, plastics such as polymethylmethacrylate, nylon, polyethylene, polypropylene, and polycarbonate type materials; metals such as iron, gold, silver, nickel, tungsten, and copper; inorganic composites such as glass, ceramics, metallic oxides; cellulose and various modified cellulosses.

EXAMPLE I

A microporous member of the preceeding type was fabricated from three 47 mm polycarbonate filter sheets of the type presently sold by Nuclepore Corporation, Pleasanton, Calif. under the designation Stock No. 111101. These filter sheets are approximately 10 micron thick and are permeated with approximately $6 \times 10^9$ pores per square centimeter wherein the approximately circular cross section pores average about 0.015 micron in diameter. The foregoing polycarbonate filters were asymmetrically etched with 6.25 normal aqueous sodium hydroxide solution containing 0.05% (vol./vol. basis) of the surfactant sold under the trademark Dowfax 21 A, manufactured by Dow Chemical Company, Midland, Michigan, for a period of just five minutes on only one surface of the filter and at a temperature of 40° C. The membranes were then washed free of sodium hydroxide with water and dried. Three such asymmetrically etched filters were stacked, one on top of the other such that the taper of the holes pointed in the same direction. The stack of filters were then placed between the faces of two fritted glass discs manufactured by Corning Glass Works, Corning, N.Y. and listed in their Pyrex Labware Catalog Lab-1 as No. 39535, Tube Immersion, With Fritted Disc, 60 M. The two Fritted Glass Discs with the oriented stack of filters between them were securely fastened together by means of three metal clamps. The surface of the Fritted Glass Discs which extended beyond the stack of filters and the edges of the stack of filters were sealed fluid tight with three coats of commercial epoxy type cement and allowed to cure thoroughly after each coat.

EXAMPLE II

A microporous member of the preceeding type was fabricated from five 47 mm polycarbonate filter sheets of the type presently sold by Nuclepore Corporation, Pleasanton, Calif. under the designation Stock No. 111101. These filter sheets are approximately 10 micron thick and are permeated with approximately $6 \times 10^9$ pores per square centimeter wherein the approximately circular cross section pores average about 0.015 micron in diameter. The foregoing polycarbonate filters were asymmetrically etched with 6.25 normal aqueous sodium hydroxide solution containing 0.05% (vol./vol. basis) of the surfactant sold under the trade name Dowfax 21 A, manufactured by Dow Chemical Company, Midland, Mich. for a period of just five minutes on only one surface of the filter and at a temperature of 40° C. The etched filter was then wash free of sodium hydroxide with water and then dried. Five such asymmetrically etched filters were stacked, one on top of the other such that the tapers of the holes all pointed in the same direction. The stack of etched filters were then firmly clamped together to form the above microporous member by means of a clamping device. Examples of such clamping devices are those manufactured by Nuclepore Corporation and shown in their Catalog Lab-30 Pages 36 and 37 and identified as Plastic Filter Holder Stock No. 420400 and Stainless Steel In-Line Holder, 47 mm, Stock No. 421700.

It is envisioned that the microporous member of this invention could be fabricated from microscopic, generally pyrimidal shaped particles by the two step process described below.

The requisite generally pyrimidal shaped microscopic particles may be found in nature as is well known to those skilled in the arts of minerology and chemical microscopy and crystalography. These materials can be crystallized from a solution. Some of the substances which are known to crystalize in pyrimidal shaped particles are tetraethyl ammonium chloride, silver floride mono-hydrate, lithium potassium sulfate, potassium tetrathionate, sodium tellurium phosphate and pentaerythritol and are listed in "Chemische Krystallographie" by P. Groth, published in Liepzig, Germany by Wilheim Engelmann in 1905. Additionally, pyrimidal shaped crystals are reported as zinc oxide in "Crystals", C. Bunn, Academic Press, New York, N.Y. 1964, on Page 95; and zincite (zinc oxide) in "Dana's Manual of Minerology", Revised by C. S. Hurlbut, Jr., 17th ed. Page 67, John Wiley, New York, N.Y. 1965.

For some applications it is anticipated that it will be described that the microporous member be fabricated out of other materials with quite different chemical and physical properties. Additionally, economics will play a key role in the choice of material and method of fabrication. Casting has been a time honored method for the production of a large number or uniformly shaped objects. We therefore anticipate that casting will be a significant method used for the fabrication of the requisite generally pyrimidal shaped particles.

The two step process of fabrication of the microporous member noted above consists of:

a. The microscopic, generally pyrimidal shaped particles are loosely packed in a layer, many particles thick, such that a substantial majority of the generally pyrimidal particles have their apexes directed toward one surface of the layer and correspondingly a substantial majority of the bases of the generally pyrimidal particles have their bases directed towards the second surface of the layer.

b. The oriented, packed, microscopic generally pyrimidal shaped particles are affixed together by any of the standard methods for providing containment of the particles close to one-an-other and in the initial orientation. Such techniques include, but are not limited to: welding, pressing, clamping, sintering, gluing, sealing, and brazing.

The orientation of the microscopic generally pyrimidal shaped particles described above in "a." can be accomplished by any of the various known techniques. These include but are not limited to: the application of electrical or magnetic fields such that the longer axis of the generally pyrimidal shaped particle will either line up parallel or perpendicular to the electrical or magnetic field depending upon whether the material used is diamagnetic, paramagnetic or ferromagnetic; the application of a force field; such as gravatational or centrifugal, while the particles are dispersed in a viscous fluid of a differing density from that of the pyrimidal particles, whereby the generally pyrimidal shaped particles will take up the same general orientation on moving through the viscous fluid such that in the packed layer of pyrimidal particles the apexes will be generally pointing in one direction and the bases will be directed in the opposite direction.

I have found that when an appropriate microporous member, of the type described herein, is immersed in certain solutions, such as solution U, that a differential diffusional pressure, $P_{dd}$, develops in the solution U on the two opposite sides of the microporous member. When the differential diffusional pressure, $P_{dd}$, is not exactly balanced by the external pressure, $P_e$, the solution U flows through the microporous member at the rate J. The differential diffusional pressure, under zero net solution flow, $P_{ddo}$, when $J=0$, and the net solution flow rate under zero differential external pressure, $J_o$, when $P_e=0$, are both useful for the characterization of the microporous member and the combination of a specific microporous member with a specific solution.

The average diameter of the solute particles, X, of the solution, U, employed in this invention, is at least 1.3 times as great as the average diameter of the solvent particles Y, of solution U. The average diameter of the solute particles X, of the solution U, employed in this invention is less than 500 times as great as the average diameter of the solvent particles Y, of solution U.

The concentration of the solute X in solution U, as used in this invention is greater than 0.01% and less than 90% on a weight/weight basis.

The solution U, used in this invention may be a true solution or a colloidal solution.

In general, a substantial majority of the ports and generally tapered voids permeating the microporous member will permit the diffusion of both the solvent particles, Y and the solute particles, X, making up the solution U, therethrough.

Any solution, provided it meets the above stated general restrictions and requirements may be used with the microporous member of this invention.

Specific examples of solvents and solutes, useful as constituents of the employed solution used in conjunction with the microporous member of this invention are enumerated below. This group is only illustrative and is in no way restrictive.

Solvents.
    Water
    Alcohols such as methanol and ethanol
    Hydrocarbons such as hexane and benzene
    Ammonia in the liquid state Solutes.
    Inorganic salts such as sodium chloride sodium sulfate.
    Organic salts such as sodium benjoate and sodium diodecyl sulfate.
    Organic such as butanol, ethylene glycol, polyethylene, sucrose, and inulin.
    Sea water is a particularly plentiful solution which can be used with the microporous member of the present invention.

I have found that when an appropriate microporous member, of the type described herein, is placed in a gaseous pressure gradient, that the effusional resistance of the said microporous member to gas flow is asymmetric.

Some characteristics of the interaction of the microporous member of this invention and a gas, G, may be set forth by a series of equations as set out below wherein: $R_i$=the absolute effusional resistance of the microporous member to a specified gas, G, in the first direction from side "i" of the microporous member to side "ii" of the microporous member.

T=the asolute temperature, °K, of the gas adjacent to the microporous member.

$P_i$=the pressure of the gas on side "i" of the microporous member.

d=thickness of the microporous member.

A=the area of the microporous member.

Q=the net gas flow rate through the area A of the microporous member.

$R_{ii}$=the absolute effusional resistance of the microporous member to the specified gas, G, in the second direction from side "ii" of the microporous member to side "i" of the microporous member.

$P_{ii}$=the pressure of the gas on side "ii" of the microporous member.

When the gas pessure is set so that $P_i$ is the operating pressure on side "i" at T °K, and at the same time $P_{ii}$ is held near zero Torr so that $P_i$ is much greater than $P_{ii}$, $R_i$ is defined by Equation (2):

$$R_i = AP_i/Qd \qquad (2)$$

and correspondingly when the gas pressure is set so that $P_{ii}$ is the operating pressure on side "ii" at T °K, and at the same time $P_i$ is held near zero Torr so that $P_{ii}$ is much greater than $P_i$, $R_{ii}$ is defined by Equation (3).

$$R_{ii} = AP_{ii}/Qd \qquad (3)$$

When, for a particular microporous member with a particular gas and at a temperature, T °K, if $R_i$ and $R_{ii}$, the absolute effusional resistance of the given microporous member in the two opposite directions, as calculated from Equations (2) and (3) respectively are not equal under conditions where $P_i$ and $P_{ii}$ in Equations (2) and (3) respectively are equal, then the microporous member's absolute effusional resistance is anisotropic for those specific operating conditions.

The microporous member's mean absolute effusional resistance coefficient, $\epsilon$, is defined by Equation (4).

$$\xi = \frac{2(R_i - R_{ii})}{R_i + r_{ii}} \qquad \text{Equation (4)}$$

and $\epsilon$ is a measure of the microporous member's anisotrophy. For a given single microporous member and a given gas under specified temperature and pressure, the mean absolute effusional resistance coefficient, $\epsilon$, must be greater than $10^{-4}$ and less than 2.0, and may have intermediate values such as 0.1.

A wide variety of gases and mixtures of gases, can be used in conjunction with the microporous member of the present invention, such as but not limited to: air, water in the vapor state, hydrogen, helium, argon, ammonia, sulfur dioxide, hydrocarbons such as methane, perhalogenated hydrocarbons such as tetrafluoromethane and octafluorocyclobutane, partially halogenated hydrocarbons such as dichloromethane, nitrogen, oxygen, and flourine.

The temperature and pressure of the gas used in conjunction with the microporous member of the present invention cover a very wide range limited only by the chemical and physical stability of both the gas and the particular microporous member and that value of the absolute effusional resistance coefficient, $\epsilon$, for the system in question, is greater than $10^{-4}$ and less than 2.0. With these caveats and restrictions, the member is operational at any pressure or temperature which does not degrade or destroy the member.

With rod shaped molecules and rod shaped solute particles, the use of the members of the present invention are especially effective. This is believed to occur because the tapered part of the opening tends to orient the molecules or particles and permit their passage through the member in the direction from the wide opening side to the narrow opening side.

The present embodiments of this invention are thus to be considered in all respects as illustrative and not restrictive, the scope of the invention being indicated by the appended claims rather than by the foregoing description. All changes which come within the meaning and range of equivalency of the claims therefore are intended to be embraced therein.

I claim:

1. A microporous membrane of a relatively fluid impermeable material having first and second surfaces, permeated by numerous asymmetric pores comprising a series of sequentially directly interconnected generally tapered voids, wherein substantially all of the generally tapered voids are oriented such that the apexes of said generally tapered voids are directed toward the first surface of the microporous membrane and substantially all of the bases of the generally tapered voids are directed toward the second surface of the microporous membrane, and wherein a fluid, upon passing completely through the microporous membrane will pass through at least three and generally less than 10,000,000 sequentially connected generally tapered voids, and wherein the microporous membrane is greater than about 0.001 micron in thickness and less than about 100 centimeters in thickness, and wherein the average distance across the base of each of the generally tapered voids is greater than about 0.001 micron and less than about 100 micron and wherein the average angle at the apex of each of the generally tapered voids is greater than about 10° and less than about 160°, and wherein the average distance across the ports interconnecting the generally tapered voids is greater than about 0.0002 micron and less than about 100 microns, and wherein the pores interconnecting the voids are fluid impervious so that fluid can only flow through the voids and interconnecting ports and wherein there are on the average at least two and less than 16 ports interconnecting each of the generally tapered voids, and wherein the average number of asymmetric pores passing through the microporous membrane is greater than about 10 per square centimeter.

2. The microporous membrane of claim 1 wherein the average number of asymmetric pores passing through the microporous membrane is less than about $10^{14}$ per square centimeter.

3. The microporous membrane of claim 1 wherein said membrane is surrounded by a gas.

4. The microporous membrane of claim 1 wherein said membrane is surrounded by a solution wherein the average diameter of the solute particles of said solution is at least 1.3 times as great as the average diameter of the solvent particles, and wherein the average diameter of the solute particles is less than 500 times as great as the average diameter of the solvent particles.

* * * * *